US 9,073,163 B2

(12) United States Patent
Li

(10) Patent No.: US 9,073,163 B2
(45) Date of Patent: Jul. 7, 2015

(54) ELLIPTICALLY MOVING MECHANISM

(71) Applicant: GISON MACHINERY CO., LTD., Taichung (TW)

(72) Inventor: Kuang-Tai Li, Taichung (TW)

(73) Assignee: GISON MACHINERY CO., LTD., Taichung (TW)

( * ) Notice: Subject to any disclaimer, the term of this patent is extended or adjusted under 35 U.S.C. 154(b) by 425 days.

(21) Appl. No.: 13/678,483

(22) Filed: Nov. 15, 2012

(65) Prior Publication Data

US 2014/0130623 A1 May 15, 2014

(51) Int. Cl.
| | |
|---|---|
| *F16H 21/36* | (2006.01) |
| *B23Q 27/00* | (2006.01) |
| *F16H 25/02* | (2006.01) |
| *F16H 35/16* | (2006.01) |

(52) U.S. Cl.
CPC ......... *B23Q 27/003* (2013.01); *Y10T 74/18248* (2015.01); *F16H 25/02* (2013.01); *F16H 35/16* (2013.01)

(58) Field of Classification Search
CPC ......... F16H 25/02; F16H 35/16; F16H 21/36; B23Q 27/003
See application file for complete search history.

(56) References Cited

U.S. PATENT DOCUMENTS

| | | | |
|---|---|---|---|
| 517,522 A | 4/1894 | King | |
| 2,477,203 A * | 7/1949 | Rabinowitz | 33/30.4 |
| 2,667,193 A * | 1/1954 | Sherman | 144/142 |
| 2,992,485 A * | 7/1961 | Karlsberg | 33/31 |
| 3,204,470 A * | 9/1965 | Brucker | 74/50 |
| 3,422,538 A * | 1/1969 | Panissidi | 33/26 |
| 4,048,724 A | 9/1977 | Keuver | |
| 4,316,569 A * | 2/1982 | Gentile | 226/158 |
| 4,567,927 A | 2/1986 | Plamann | |
| 5,189,800 A * | 3/1993 | Morita et al. | 33/30.1 |
| 7,010,860 B2 * | 3/2006 | Gardner et al. | 30/310 |

FOREIGN PATENT DOCUMENTS

CA    2 250 561    7/1999

* cited by examiner

*Primary Examiner* — David M Fenstermacher
(74) *Attorney, Agent, or Firm* — Guice Patents PLLC

(57) ABSTRACT

An elliptically moving mechanism includes: a track disc formed with two tracks, the two tracks perpendicularly intersecting each other; a transmission ring rotatably fitted around a circumference of the track disc; a rocking arm positioned under the track disc; and two slide members disposed on a top face of the rocking arm. The rocking arm is connected to the two tracks via the two slide members. The two slide members are slidable along the two tracks respectively. When the transmission ring is rotated, the rocking arm is driven by the transmission ring to move in an elliptical path. The elliptically moving mechanism is easy to manufacture and assemble and has a small volume and is lightweight. Moreover, the mechanism provides different elliptical paths of different sizes.

18 Claims, 10 Drawing Sheets

ELLIPTICALLY MOVING MECHANISM

BACKGROUND OF THE INVENTION

1. Field of the Invention

The present invention relates generally to a mechanical mechanism, and more particularly to an elliptically moving mechanism.

2. Description of the Related Art

It is known that in some cases, it is necessary to cut an elliptical hole on a board material or an object such as awash sink of a washstand. U.S. Pat. No. 4,567,927 discloses an apparatus for automatically forming ovals. The apparatus enables a cutting tool to move in an elliptical path for cutting ovals.

The apparatus includes a support frame 10 composed of a pair of uprights 12 and a pair of cantilevered support arms 14. A support disk 26 is fixed by the cantilevered support arms 14. A ring 28 is suspended and pivotally rotatably disposed under the support disk 26. A first track 34 is disposed on the support disk 26. A second track 36 is supported by two uprights 38 and positioned above the first track 34. The second track 36 is perpendicular to the first track 34. A first bearing block 40 is slidably disposed in the first track 34 and a second bearing block 44 is slidably disposed in the second track 36. A trammel beam 56 is composed of an upper beam 56a and a lower beam 56b. The upper beam 56a is disposed on upper side of the support disk 26 and positioned between the first and second tracks 34, 36. The lower beam 56b is disposed under the support disk 26. The top and bottom ends of the first slide block 40 are respectively connected with the upper and lower beams 56a, 56b of the trammel beam 56. A tool-holding bracket 84 is mounted on the lower beam 56b. A cutting tool 92 is mounted on the tool-holding bracket 84. A threaded rod 108 is screwed with the tool-holding bracket 84 for driving the tool-holding bracket 84 and the cutting tool 92 to slide along the lower beam 56a. The ring 28 is drivable by an electrical motor 112, whereby the apparatus can provide an elliptical path 115 to cut an oval hole.

In the above apparatus, the cutting tool 92 is mounted under the support disk 26 for cutting the oval hole. Such arrangement has some shortcomings as follows:

First, the first and second tracks 34, 36 are up and down arranged so that it is necessary to use multiple cantilevered support arms and supports to fix the support disk 26 and the second track 36 respectively. Therefore, the entire support structure is quite complicated and hard to assemble. Moreover, the two tracks 34, 36 must be manufactured respectively. Also, the apparatus includes too many components. This leads to inconvenience in manufacturing the apparatus and the assembling cost of the apparatus is very high.

Second, the largest oval hole that can be cut by the apparatus cannot exceed the range of the support disk 26. As shown in FIG. 1 of the above patent, the length of the long axis of the elliptical path 115 is exactly the largest range that can be cut by the apparatus. This is because in the case that the lower beam 56b of the trammel beam 56, the tool-holding bracket 84 and the cutting tool 92 exceed the support disk 26, they will be obstructed by the uprights 12 from operating. Therefore, for cutting a larger oval hole, it is necessary to manufacture an even larger support disk 26 and ring 28 and longer tracks 34, 36. In this case, the entire apparatus will be huge and very heavy.

SUMMARY OF THE INVENTION

It is therefore a primary object of the present invention to provide an elliptically moving mechanism, which can offer an elliptical path. The elliptically moving mechanism is easy to manufacture and assemble.

The present invention of the present invention is to provide an elliptically moving mechanism, which includes two tracks and a rocking arm. The object of the present invention is that the elliptically moving mechanism is in the form of the rocking arm being positioned under the two tracks with the two tracks are positioned on the same plane and intersect each other.

The present invention of the present invention is to provide an elliptically moving mechanism, which includes a track disc and a rocking arm, two tracks are disposed on the track disc and perpendicularly arranged, and the rocking arm is pivotally connected to the two tracks. The object of the present invention is that the rocking arm can move in an elliptical path larger than or smaller than the track disc.

The elliptically moving mechanism of the present invention includes:

a track disc having the form of a circular disc and formed with two tracks, two tracks perpendicularly intersecting each other at an intersection where a hollow section is formed;

a transmission ring, which is a ring body, a transmission section being disposed on an outer circumference of the transmission ring, the transmission ring being rotatably fitted around a circumference of the track disc; and a rocking arm positioned under the track disc; two slide members disposed on a top face of the rocking arm and the rocking arm being connected with the two tracks via the slide members, the first slide member being slidable along the first track and the second slide member being slidable along the second track.

When the transmission ring is rotated, the rocking arm is driven by the transmission ring to move an elliptical path.

The elliptically moving mechanism of the present invention is easy to manufacture and assemble. Moreover, the total volume of the elliptically moving mechanism is smaller. The elliptically moving mechanism is able to make an elliptical path larger than or smaller than the track disc.

The present invention can be best understood through the following description and accompanying drawings, wherein:

DETAILED DESCRIPTION OF THE PREFERRED EMBODIMENTS

Figure 1:
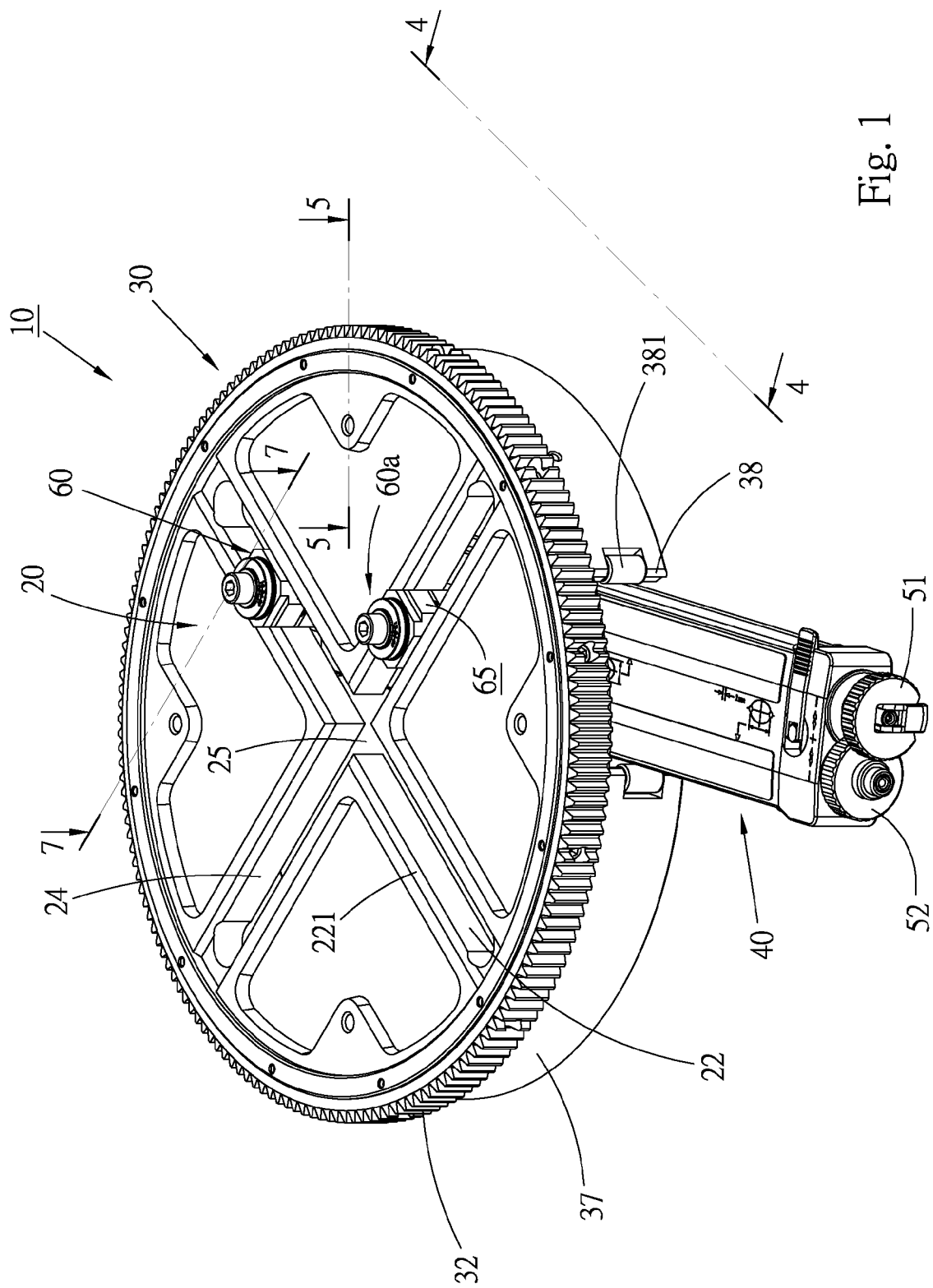
FIG. 1 is a perspective view of a preferred embodiment of the present invention.
Figure 2:
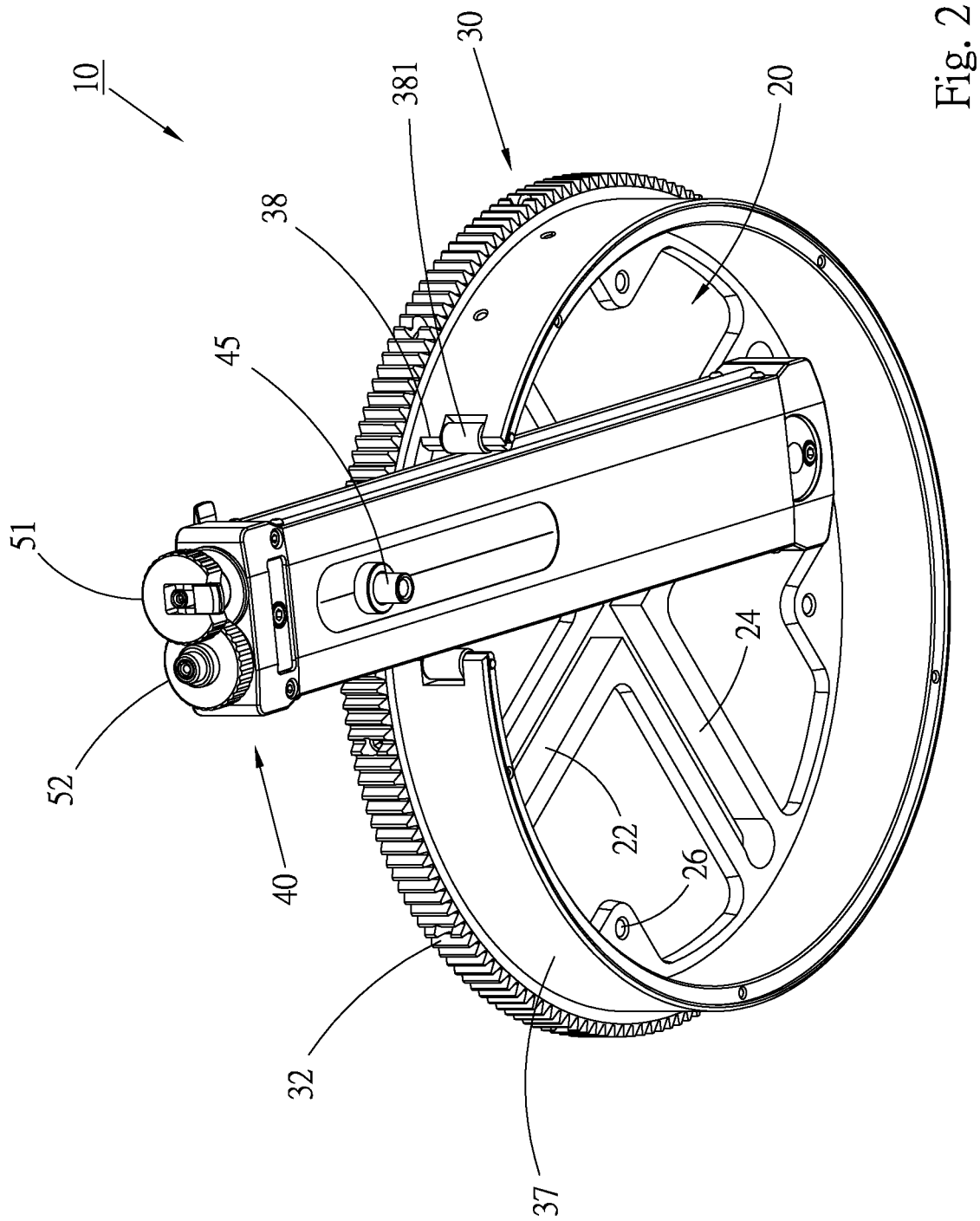
FIG. 2 is a bottom perspective view of the preferred embodiment of the present invention.
Figure 3:
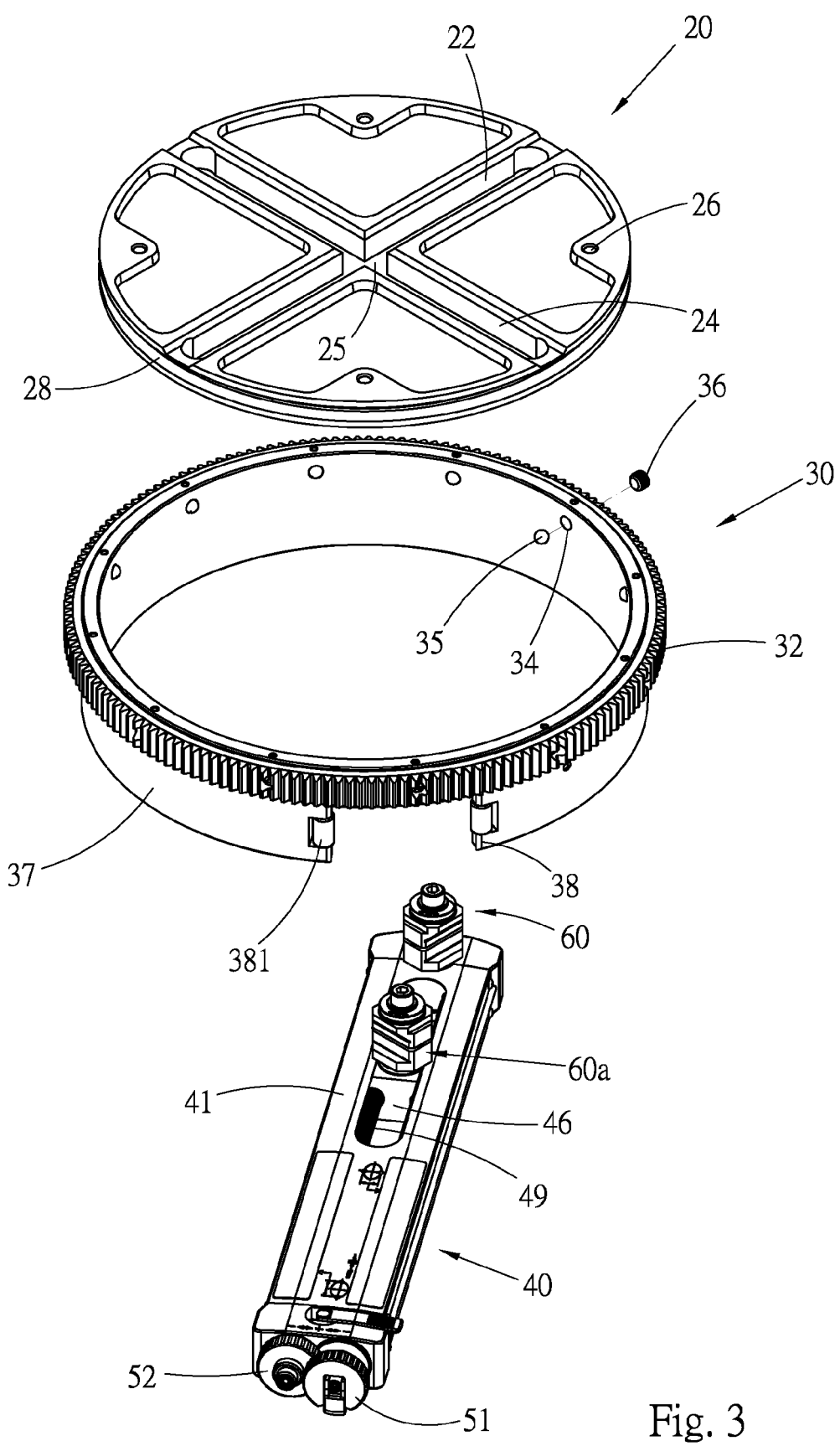
FIG. 3 is a perspective exploded view of the preferred embodiment of the present invention.

Please refer to FIGS. 1 to 3. According to a preferred embodiment, the elliptically moving mechanism 10 of the present invention includes a track disc 20, a transmission ring 30, a rocking arm 40 and two slide members 60, 60a.

The track disc 20 has the form of a circular disc and is formed with a first track 22 and a second track 24 perpendicular to the first track 22. The two tracks 22, 24 are in the form of slots and intersect each other on the same plane. A hollow section 25 is formed at the intersection of the two tracks 22, 24. As the tracks are in the form of slots, top and bottom sides of the tracks 22, 24 are open so that the top and bottom sides of the hollow section 25 are also open. Four connection holes 26 are uniformly formed on the track disc 20.

Figure 5:
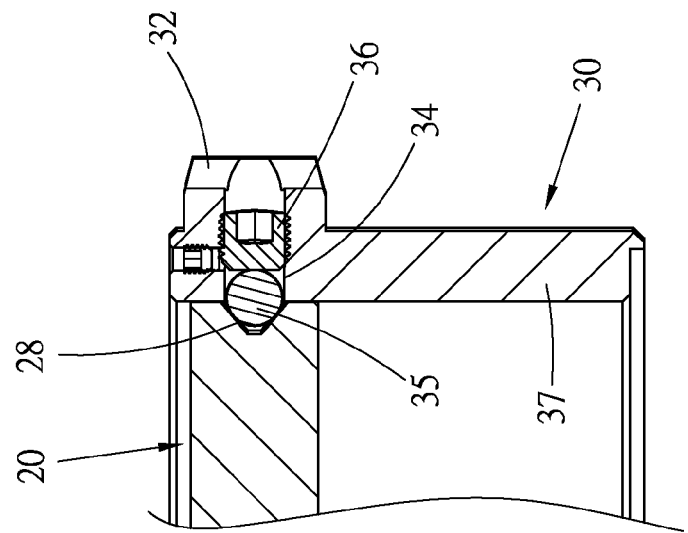
FIG. 5 is a sectional view taken along line 5-5 of FIG. 1.
Figure 4:
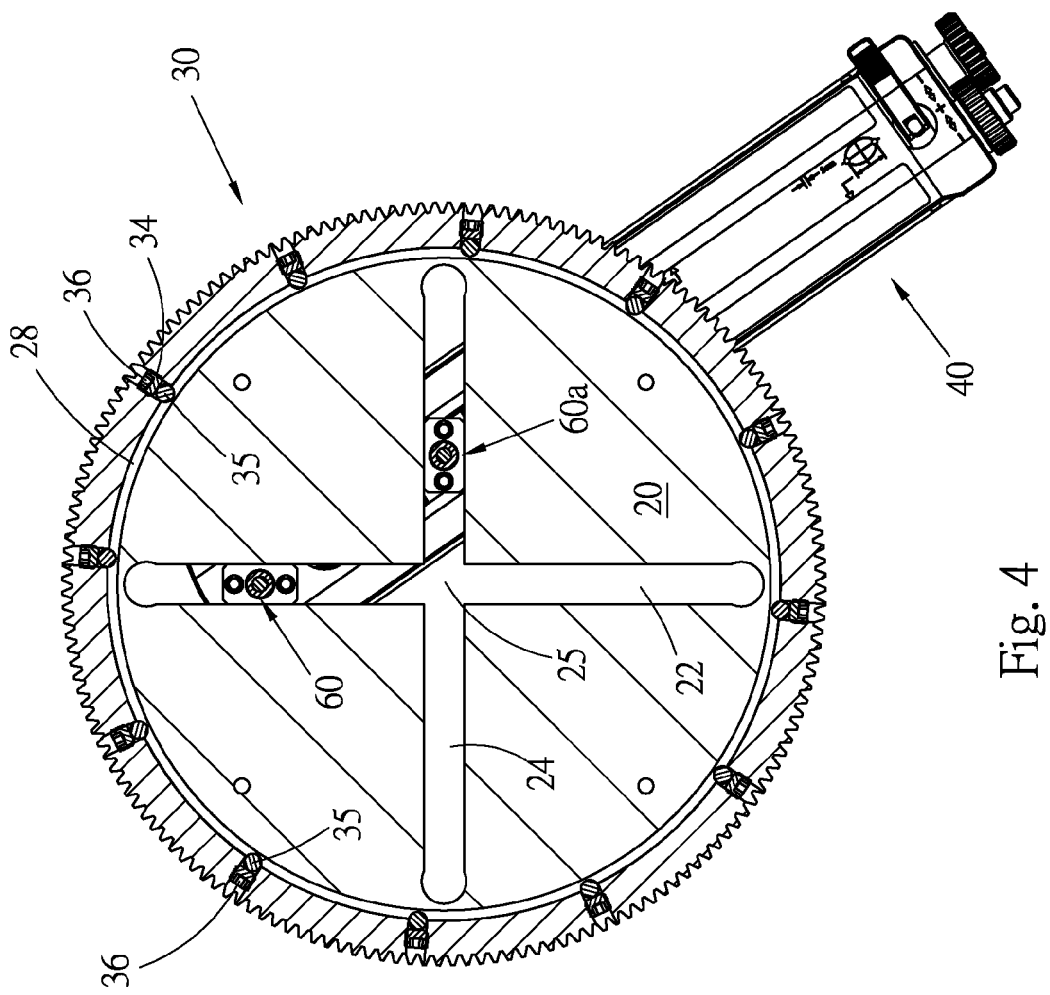
FIG. 4 is a sectional view taken along line 4-4 of FIG. 1.

The transmission ring 30 is a ring body. An outer circumference of the transmission ring 30 has a transmission section 32 such as an annular toothed section having multiple teeth. The transmission ring 30 is rotatably fitted around a circumference of the track disc 20. The circumference of the track disc 20 is formed with an annular groove 28. The transmission ring 30 is formed with multiple radial installation holes 34 distributed on the transmission ring at equal intervals. Multiple insertion members 35 are respectively mounted in the installation holes 34 as shown in FIGS. 4 and 5. Preferably, the insertion members 35 are steel balls for reducing friction. The insertion members 35 protrude from inner ends of the installation holes 34 into the annular groove 28 of the track disc 20. Accordingly, the transmission ring 30 is rotatable around the track disc 20 without detaching therefrom. Multiple caps 36 are screwed in outer ends of the installation holes 34 to block the outer ends of the installation holes and prevent the insertion members 35 from dropping out of the installation holes.

In addition, the transmission ring 30 has an annular skirt section 37 downward extending from the transmission ring 30. The skirt section 37 has an opening 38. Two rollers 381 are respectively disposed on two sidewalls of the opening 38. In this embodiment, the skirt section 37 has a width of 360-degree arc. In practice, the skirt section 37 only needs to have a width sufficient for forming the opening 38.

The rocking arm 40 is an elongated member having a housing 41. Please refer to FIG. 6. A first shaft rod 42 and a second shaft rod 44 are disposed on the rocking arm 40. The shaft rods 42, 44 protrude from a top face of the rocking arm. As shown in FIG. 2, a tool connection section 45 is disposed under a bottom face of the rocking arm 40. Two guide rails 43 and two slide seats 46, 47 are disposed in the rocking arm 40. The slide seats are longitudinally movable along the length of the rocking arm under the guide of the guide rails. Two threaded rods 48, 49 are longitudinally disposed in the rocking arm and respectively screwed through the slide seats 46, 47. Two adjustment buttons 51, 52 are respectively fixedly connected with first ends of the threaded rods 48, 49. The two adjustment buttons 51, 52 and the two threaded rods 48, 49 form two adjustment assemblies. When rotating the adjustment buttons, the two slide seats 46, 47 are driven to slide via the two threaded rods 48, 49. The first shaft rod 42 is positioned at an inner end of the rocking arm 40 and is fixed. The second shaft rod 44 is disposed on the first slide seat 46. The tool connection section 45 is mounted on the second slide seat 47 in adjacency to an outer end of the rocking arm 40. The second slide seat 47 is a tool slide seat. A cutting tool can be connected to the tool slide seat 47 via the tool connection section 45. The configuration of the tool connection section 45 is not limited to the structure of this embodiment. The second shaft rod 44 is positioned between the first shaft rod 42 and the tool connection section 45. When the two slide seats 46, 47 are moved, the positions of the second shaft rod 44 and the tool connection sections 45 can be adjusted.

The two slide members 60, 60a have identical structures. Therefore, only the slide member 60 will be described hereinafter. The same components of the slide members 60, 60a are denoted with the same reference numerals.

Figure 6:
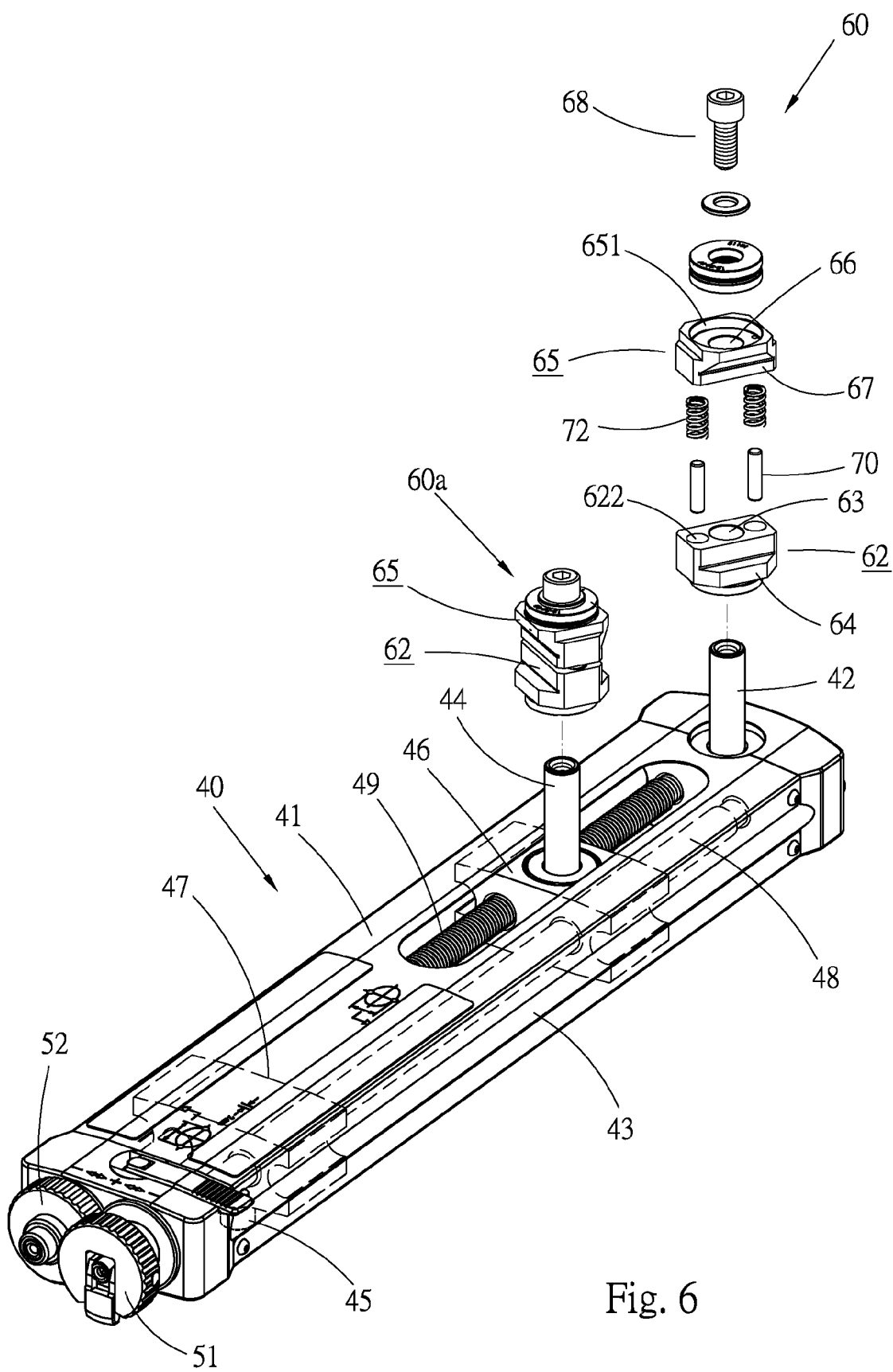
FIG. 6 is a perspective exploded view of the slide member of the preferred embodiment of the present invention.
Figure 7:
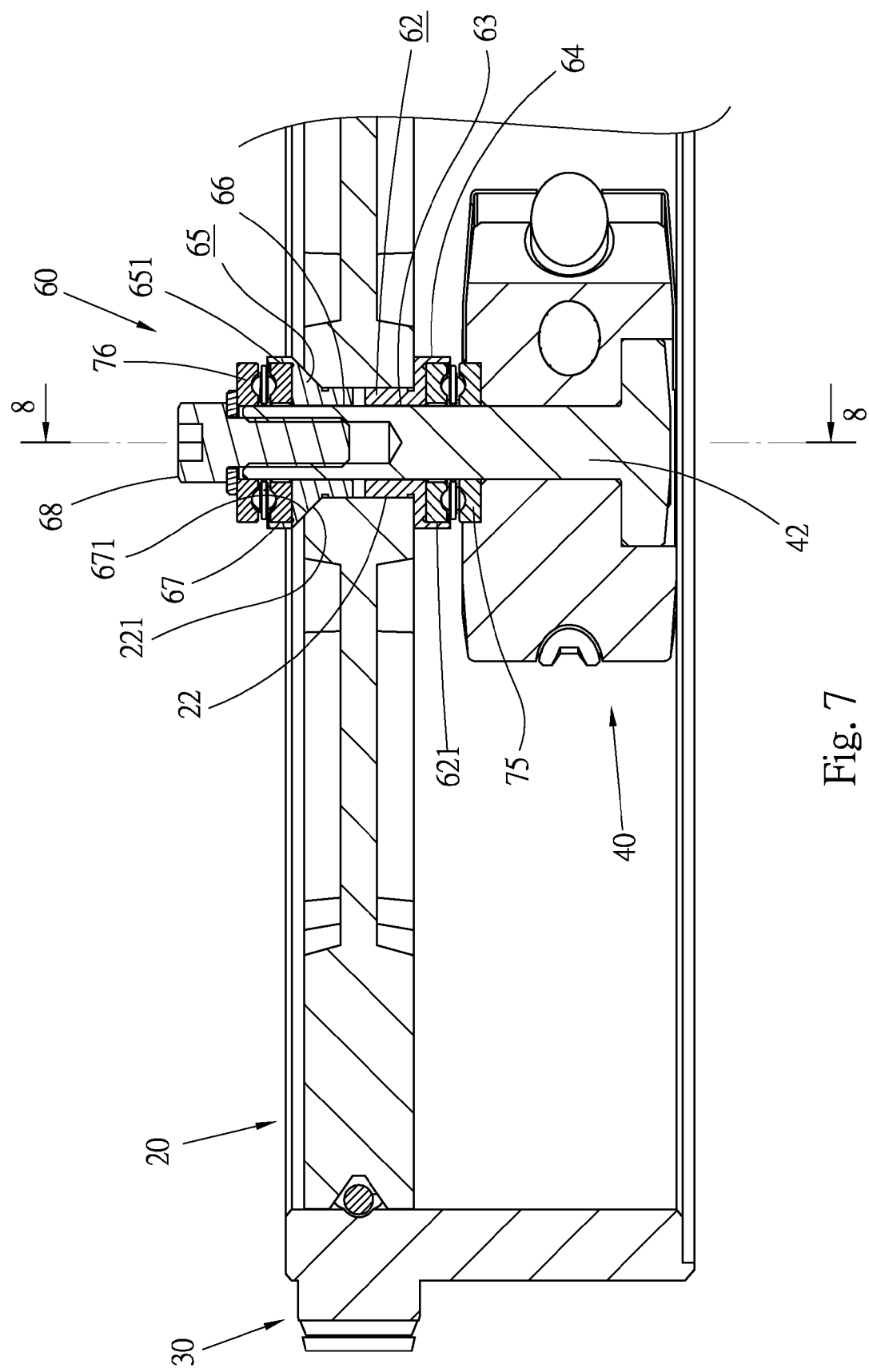
FIG. 7 is a sectional view taken along line 7-7 of FIG. 1.
Figure 8:
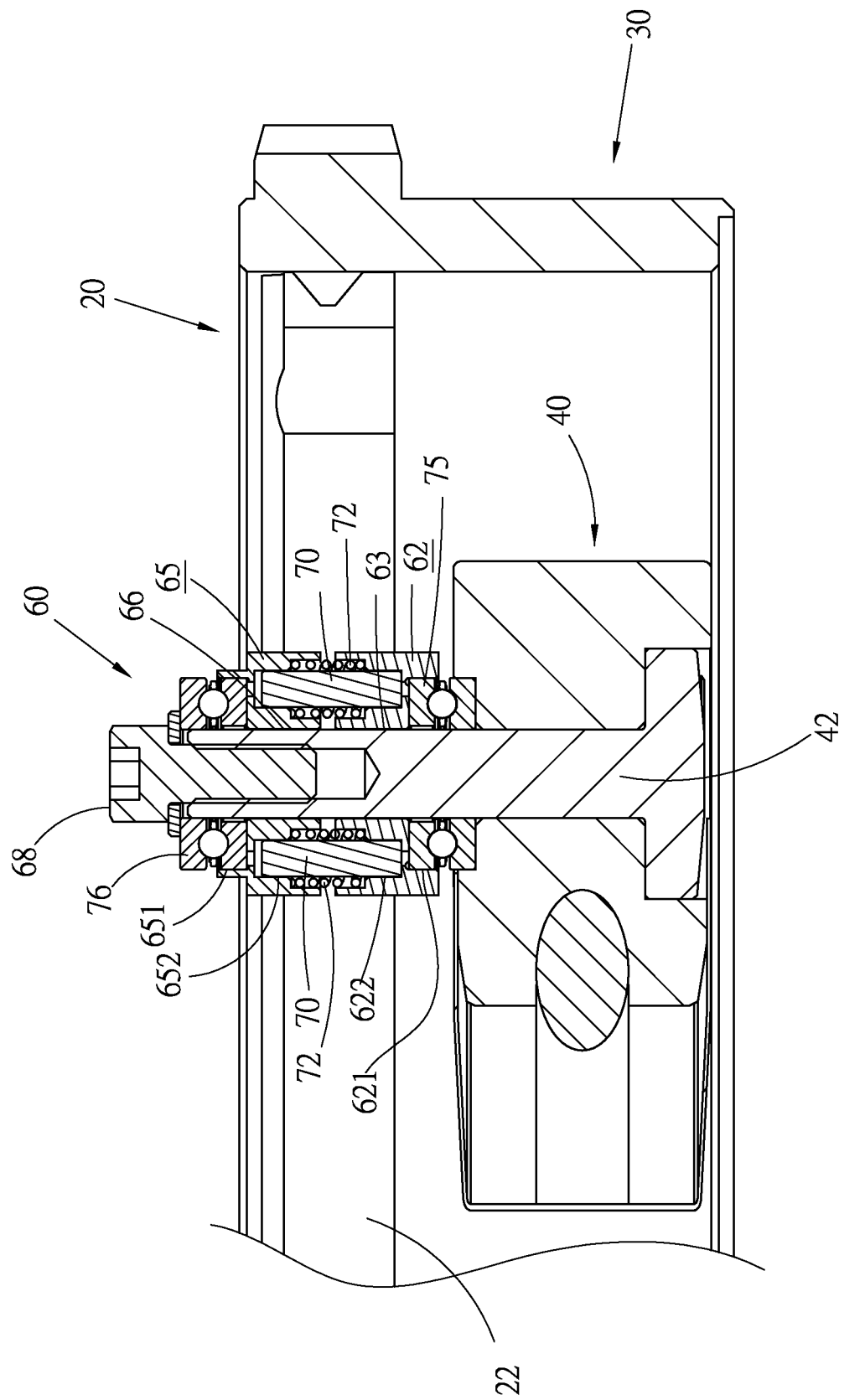
FIG. 8 is a sectional view taken along line 8-8 of FIG. 7.

Please now refer to FIGS. 6 to 8. The first slide member 60 has a lower slide block 62 and an upper slide block 65. The lower slide block 62 is formed with a central through hole 63. Two shoulder sections 64 respectively outward extend from two sides of the slide block 62. The upper slide block 65 is also formed with a central through hole 66. Two shoulder sections 67 also respectively outward extend from two sides of the slide block 65. The first shaft rod 42 is fitted through the through holes 63, 66 of the upper and lower slide blocks 62, 65, whereby the upper and lower slide blocks 62, 65 are rotatable around the shaft rod 42. A threaded member 68 is screwed in top end of the shaft rod 42, whereby the first track 22 is held in a gap between the two slide blocks 62, 65. A lower bearing 75 is disposed in a bearing cavity 621 of a bottom face of the lower slide block 62 for reducing friction between a bottom end of the lower slide block and a top face of the rocking arm 40. An upper bearing 76 is disposed in a bearing cavity 651 of a top face of the upper slide block 65 for reducing friction between a top end of the upper slide block and the threaded member 68.

Two insertion pins 70 are inserted between the upper and lower slide blocks 62, 65. Top and bottom ends of the two insertion pins 70 are respectively inserted in pinholes 622, 652 of the two slide blocks, whereby the two slide blocks can synchronously rotate around the first shaft rod 42. Two springs 72 are respectively fitted on the insertion pins 70. Two ends of the springs respectively elastically abut against the two slide blocks 62, 65 to keep the two slide blocks spaced from each other.

The first slide member 60 is mounted on the first shaft rod 42 and assembled on the first track 22 of the track disc 20. The body of the lower slide block 62 is positioned inside the first track 22. Two shoulder sections 64 of the lower slide block 62 respectively contact bottom edges of two sides of the first track 22 as shown in FIG. 7. The body of the upper slide block 65 is also positioned inside the first track 22. Bottom sides of the two shoulder sections 67 of the upper slide block 65 are formed with slopes 671 in contact with slopes 221 of top edges of two sides of the first track 22. Accordingly, the slide member 60 and the shaft rod 42 can reciprocally slide along the first track 22. The slopes 221, 671 contact each other to provide multiple effects. First, due to gravity, the slopes can more tightly contact each other so that the upper slide block can more securely connect with the track 22. Second, the upper slide block 65 will not deflect within the first track 22 so that the entire slide member is prevented from deflecting from the track. Third, the center of the shaft rod 42 and the center of the slide member 60 are positioned at the center of the first track so that the slide member 60 can easily slide along the track 22 under minimized friction.

Similarly, the second slide member 60a is mounted on the second shaft rod 44 and connected with the second track 24 in a manner identical to that of the first slide member 60. Therefore, the second shaft rod 44 and the second slide member 60a can reciprocally slide along the second track 24.

The rocking arm 40 is movably connected with the track disc 20 via the two slide members 60, 60a and is positioned under the track disc 20. The outer end of the rocking arm extends through the opening 38 of the skirt section 37 of the transmission ring 30 out of the transmission ring. The two rollers 381 on two sides of the opening 38 contact two lateral faces of the rocking arm so as to enhance stability of sliding of the rocking arm within the opening 38 and reduce friction.

The skirt section 37 and the opening 38 serve as a link member between the transmission ring 30 and the rocking arm 40 for drivingly connecting the rocking arm with the transmission ring 30. When the transmission ring 30 is rotated, the rocking arm 40 is driven to operate. The link structure between the transmission ring and the rocking arm is not limited to the skirt section and the opening of this embodiment. Alternatively, the transmission ring can be connected to the rocking arm via a different kind of link member. Such as a top end of the link member is fixedly connected with the transmission ring, while a bottom end or a bottom section of the link member is connected with the rocking arm. The rocking arm can slide along the bottom end or bottom section of the link member. For example, the link member can be a U-shaped frame having a hollow section (opening or hole). The top end of the U-shaped frame is fixedly connected with the transmission ring, while the rocking arm is passed through the hollow section of the U-shaped frame.

Figure 9:
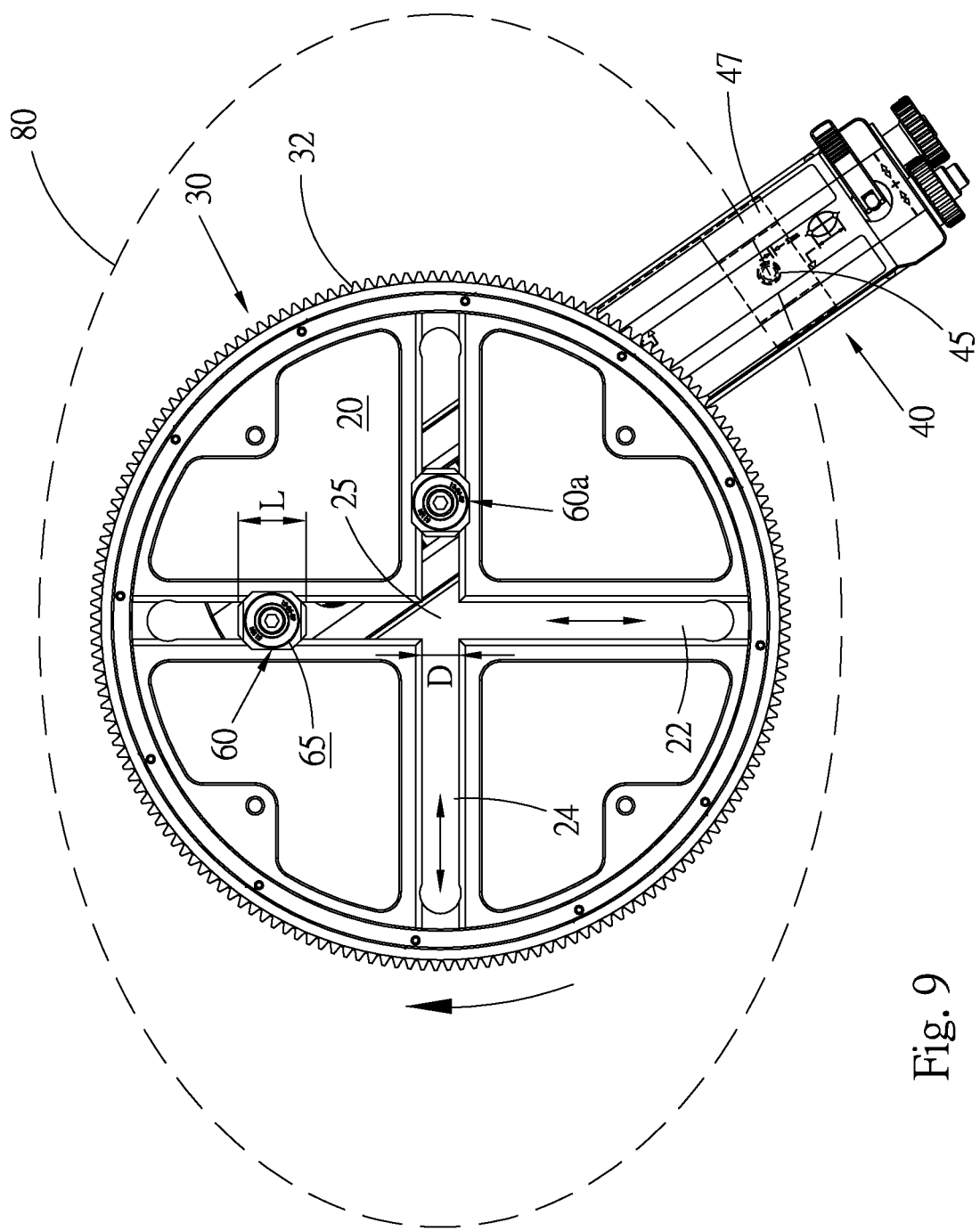
FIG. 9 is a top view of the preferred embodiment of the present invention, showing that the tool connection section moves in an elliptical path.

In use of the elliptically moving mechanism 10, the track disc 20 is fixed and a motor (not shown) is engaged with the annular toothed section 32 of the transmission ring 30 for driving the transmission ring to rotate. At this time, the rocking arm 40 is driven by the transmission ring 30 and the first slide member 60 reciprocally moves along the first track 22, while the second slide member 60a reciprocally moves along the second track 24 as shown in FIG. 9. Accordingly, the rocking arm 40 not only is rotated, but also is slid along the radius of the transmission ring 30 (within the opening 38). In this case, the second slide seat 47 and the tool connection section 45 of the rocking arm 40 move in an elliptical path 80 larger than the track disc 20, that is, outside the track disc.

The structure of the present invention allows the two tracks 22, 24 to be positioned on the same level and the slide members 60, 60a can pass through the hollow section 25 of the intersection of the two tracks without dropping out from the hollow section. It should be noted that in the case that the rocking arm is positioned above the track disc, then the bottom faces of the two tracks can be closed and the intersection of the two tracks will have a bottom wall, under such circumstance, the slide members can pass through the intersection of the two tracks without dropping out therefrom. However, the rocking arm of the present invention is installed under the track disc, and the tracks are positioned on the same plane with a hollow section 25 formed at the intersection of the two tracks, it is an effect of the present invention that the slide members slide through the hollow section 25 without dropping. In this embodiment, the length L of the upper slide block 65 of the slide member is larger than the width D of the hollow section 25. Therefore, when the slide member passes through the hollow section, the upper slide member is not totally suspended. Accordingly, the slide member can successfully slide from one end of the track through the hollow section to the other end of the track.

Figure 10:
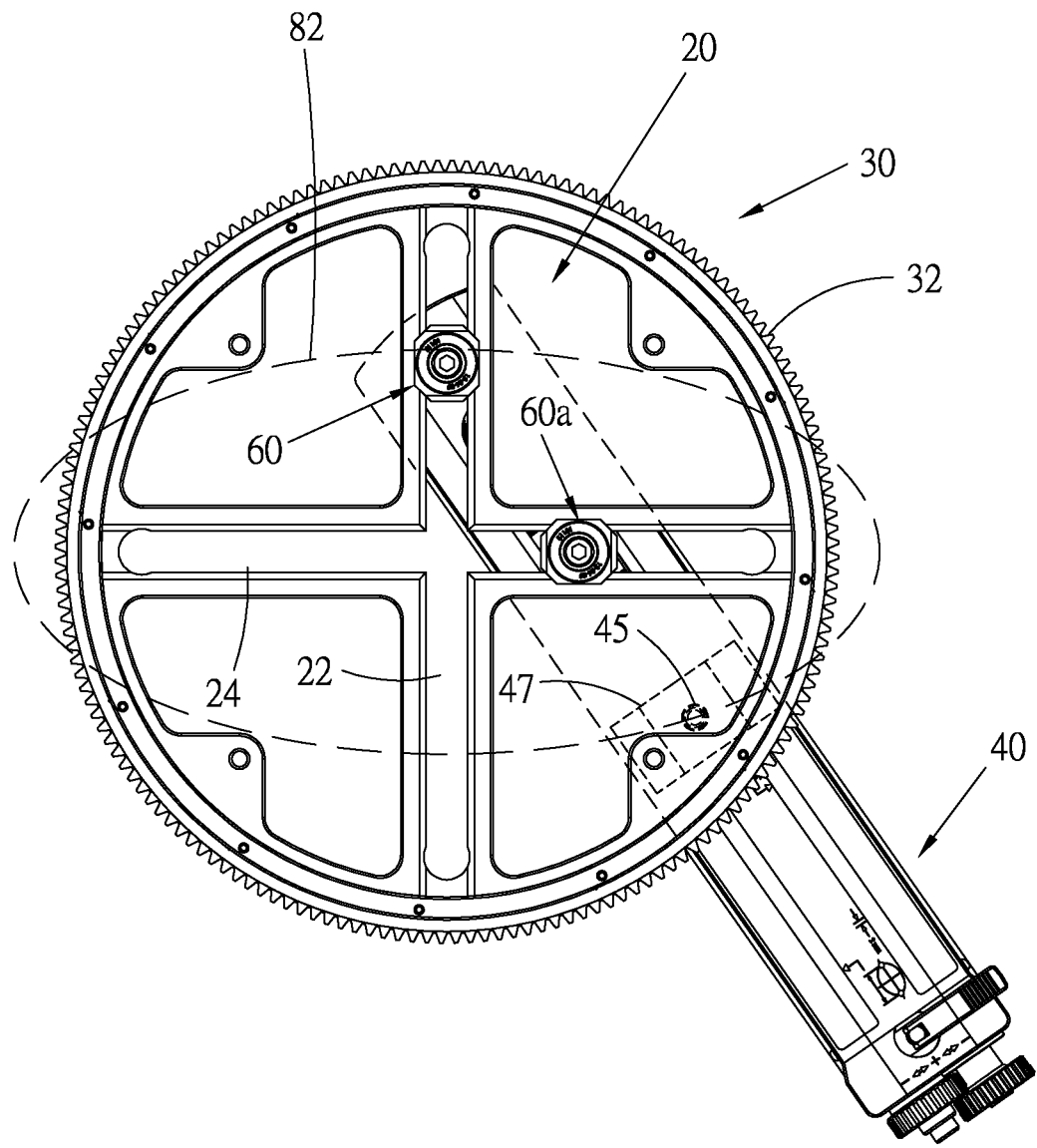
FIG. 10 is a top view of the preferred embodiment of the present invention, showing that the tool connection section moves in another elliptical path.

By means of adjusting the positions of the first slide seat 46 and the second slide seat 47, the size of the elliptical path and the lengths of the long axis and short axis of the elliptical path can be changed. Please refer to FIG. 10, which shows that the second slide seat 47 is moved toward the inner end of rocking arm 40. In this case, the position of the tool connection section 45 will move in a smaller elliptical path 82, which is within the range of the track disc 20.

Figure 11:
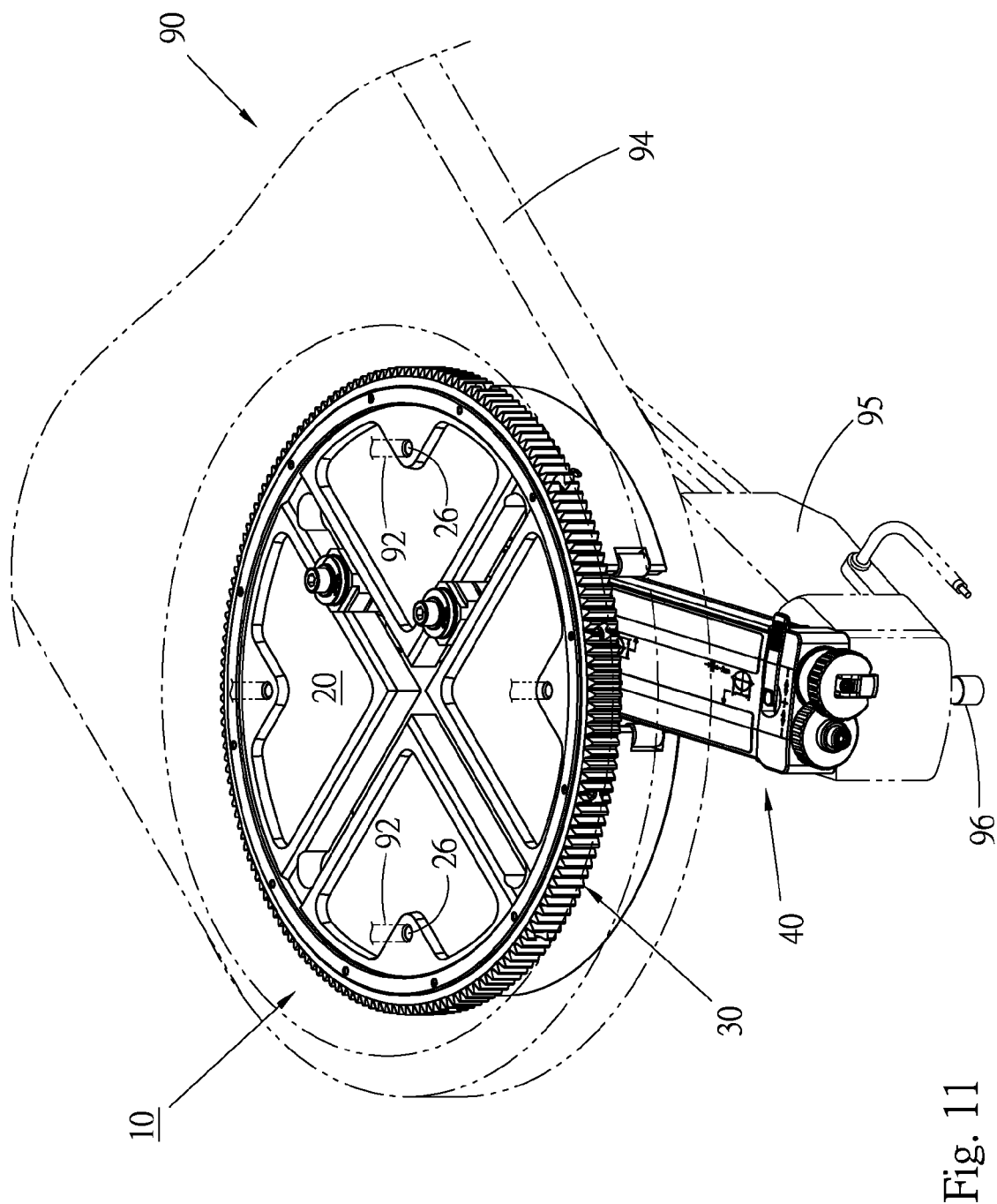
FIG. 11 is a perspective view of the preferred embodiment of the present invention, showing the application thereof.

Please now refer to FIG. 11. The present invention is applicable to a cutting apparatus 90. The connection holes 26 of the track disc 20 are fixedly connected with a cantilever 94 by means of rod bodies such as threaded rods 92. A tool 95 (such as a cutting tool) is connected to the tool connection section 45 of the rocking arm 40 with the elliptically moving mechanism 20 suspended. In this case, by means of the elliptical path of the cutting apparatus 90, the cutter 96 of the cutting tool 95 can cut an elliptical hole on a work piece.

The elliptically moving mechanism of the present invention has a simple structure and is easy to manufacture and assemble.

The elliptically moving mechanism of the present invention can provide an elliptical path larger than the transmission ring or an elliptical path smaller than the track disc. Therefore, different sizes of elliptical holes can be formed by means of the elliptically moving mechanism of the present invention.

In the elliptically moving mechanism of the present invention, the rocking arm is positioned under the track disc and the two tracks are together formed on the same plane of the track disc to intersect each other. Under such circumstance, the track disc is easy to manufacture and the tracks are easy to form. Moreover, the two tracks and the entire elliptically moving mechanism can be fixed simply by means of fixing the track disc. Therefore, it is unnecessary to use any support and thus the total volume of the elliptically moving mechanism is greatly minified. Accordingly, it is easy to install the elliptically moving mechanism and the occupied room is reduced.

The above embodiments are only used to illustrate the present invention, not intended to limit the scope thereof. Many modifications of the above embodiments can be made without departing from the spirit of the present invention. For example, the manner in which the track disc is fitted with the transmission ring is not limited to this embodiment. Also, the bottom sides of the two tracks must be open, while the top sides of the two tracks can be open or closed. The bottom end of the hollow section must be open, while the top end of the hollow section can be open or closed. The slide member can be a one-piece slide block, which is slidable within the track. Also, the opening of the transmission ring can have a bottom side. Alternatively, each of two lateral sides of the rocking arm can be formed with a channel for the roller 381 to contact therewith.

What is claimed is:
1. An elliptically moving mechanism comprising:
a track disc having the form of a circular disc and formed with a first track and a second track perpendicular to the first track, the first and second tracks intersecting each other at an intersection where a hollow section is formed, bottom sides of the two tracks and a bottom end of the hollow section being open;
a transmission ring, which is a ring body; a transmission section being disposed on an outer circumference of the transmission ring, the transmission ring being rotatably fitted around a circumference of the track disc;
a rocking arm, which is an elongated member;
a first slide member and a second slide member, the first slide member being rotatably fitted on a first shaft rod of the rocking arm and positioned on a top face of the rocking arm; the second slide member being rotatably fitted on a second shaft rod of the rocking arm and positioned on a the top face of the rocking arm; the rocking arm being positioned under the track disc with the two slide members connected to the two tracks, the first slide member being disposed in the first track and slidable along the first track; the second slide member being disposed in the second track and slidable along the second track; and
a link member positioned between the transmission ring and the rocking arm, when the transmission ring is rotated, the rocking arm being driven by the transmission ring via the link member.

2. The elliptically moving mechanism as claimed in claim 1, wherein top sides of the two tracks and a top end of the hollow section are all open; each of the first and second slide members having an upper slide block and a lower slide block, the two slide blocks being rotatably fitted on the corresponding shaft rod; two sides of the lower slide block contacting bottom edges of two sides of the corresponding track; two sides of the upper slide block contacting top edges of two sides of the corresponding track; at least one insertion pin being connected with the upper and lower slide blocks.

3. The elliptically moving mechanism as claimed in claim 2, wherein each slide member further has at least one elastic member disposed between the upper and lower slide blocks, two ends of the elastic member respectively abutting against the two slide blocks.

4. The elliptically moving mechanism as claimed in claim 1, wherein the transmission ring has a skirt section downward extending from the transmission ring, the skirt section being formed with an opening; an outer end of the rocking arm extending through the opening out of the transmission ring.

5. The elliptically moving mechanism as claimed in claim 4, wherein two rollers are respectively disposed on two sidewalls of the opening and two sides of the rocking arm contact the two rollers respectively.

6. The elliptically moving mechanism as claimed in claim 1, comprising a first slide seat and a second slide seat disposed in the rocking arm and longitudinally movable along the rocking arm; two adjustment mechanisms being disposed on the rocking arm for driving the two slide seats to move; the second slide member being disposed on the first slide seat and positioned between the first slide member and the second slide seat.

7. The elliptically moving mechanism as claimed in claim 1, wherein a circumference of the track disc is formed with an annular groove; multiple insertion members being disposed on the transmission ring at intervals, the insertion members protruding from inner circumference of the transmission ring into the annular groove of the track disc.

8. The elliptically moving mechanism as claimed in claim 1, wherein a top end of the link member is fixedly connected with the transmission ring and the rocking arm is connected with the link member and slidable relative to the link member.

9. An elliptically moving mechanism comprising:
a track disc having the form of a circular disc and formed with a first track and a second track perpendicular to the first track, the first and second tracks intersecting each other at an intersection where a hollow section is formed, bottom sides of the two tracks and bottom end of the hollow section being open;
a transmission ring, which is a ring body; a transmission section being disposed on an outer circumference of the transmission ring; the transmission ring having a skirt section, the skirt section being formed with an opening lower than the transmission section; the transmission ring being rotatably fitted around a circumference of the track disc;
a rocking arm, which is an elongated member, the rocking arm being positioned under the track disc and passed through the opening of the transmission ring, an outer end of the rocking arm extending through the opening out of the transmission ring; and
a first slide member and a second slide member, which are pivotally disposed on a top face of the rocking arm, the two slide members being connected with the two tracks to connect the rocking arm to the two tracks, the first slide member being disposed in the first track and slidable along the first track; the second slide member being disposed in the second track and slidable along the second track, when the transmission ring is rotated, the rocking arm being driven by the transmission ring to operate.

10. The elliptically moving mechanism as claimed in claim 9, wherein the skirt section of the transmission ring is annular.

11. The elliptically moving mechanism as claimed in claim 9, comprising a first slide seat and a second slide seat disposed in the rocking arm and longitudinally movable along the rocking arm; two adjustment mechanisms being disposed on the rocking arm for driving the two slide seats to move; the second slide member being disposed on the first slide seat and positioned between the first slide member and the second slide seat.

12. An elliptically moving mechanism comprising:
a track disc having the form of a circular disc and formed with a first track and a second track in the form of slots, the first and second tracks being positioned on the same plane and perpendicularly intersecting each other at an intersection where a hollow section is formed;
a transmission ring, which is a ring body; a transmission section being disposed on an outer circumference of the transmission ring, the transmission ring being rotatably fitted around a circumference of the track disc;
a rocking arm, which is an elongated member, the rocking arm being positioned under the track disc; a first shaft rod and a second shaft rod being disposed on a top face of the rocking arm;
a first slide member and a second slide member, each of the first and second slide members having an upper slide block and a lower slide block, the upper and lower slide blocks of the first slide member being rotatably fitted on the first shaft rod, the upper and lower slide blocks of the second slide member being rotatably fitted on the second shaft rod; the first slide member being disposed in the first track and slidable along the first track; the second slide member being disposed in the second track and slidable along the second track; two sides of the lower slide block of each slide member contacting bottom edges of two sides of the corresponding track; two sides of the upper slide block of each slide member contacting top edges of two sides of the corresponding track; and
a link member positioned between the transmission ring and the rocking arm, when the transmission ring is rotated, the rocking arm being driven by the transmission ring via the link member.

13. The elliptically moving mechanism as claimed in claim 12, wherein each of top edges of two sides of each the track is formed with a slope; each of two sides of the upper slide block of each the slide member being formed with a slope, the slopes of the upper slide block being in contact with the slopes of the top edges of two sides of the corresponding track.

14. The elliptically moving mechanism as claimed in claim 12, wherein at least one insertion pin is connected between the upper and lower slide blocks of each the slide member.

15. The elliptically moving mechanism as claimed in claim 12, further comprising a first slide seat and a second slide seat, the first and second slide seats being disposed in the rocking arm and longitudinally movable along the rocking arm; two adjustment mechanisms being disposed on the rocking arm for driving the two slide seats to move; the first slide member being adjacent to an inner end of the rocking arm; the second slide member being disposed on the first slide seat and positioned between the first slide member and the second slide seat.

16. The elliptically moving mechanism as claimed in claim 15, wherein a tool connection section is disposed under a bottom face of the second slide seat.

17. The elliptically moving mechanism as claimed in claim 12, wherein the length L of the upper slide block of the slide member is larger than the width of the hollow section.

18. The elliptically moving mechanism as claimed in claim 12, wherein the transmission ring has a skirt section downward extending from the transmission ring, the skirt section being formed with an opening; an outer end of the rocking arm extending through the opening out of the transmission ring; the skirt section and the opening serve as the link member.

\* \* \* \* \*